No. 868,061. PATENTED OCT. 15, 1907.
G. H. ZEMPTER.
COTTON HARVESTING MACHINE.
APPLICATION FILED MAR. 12, 1907.
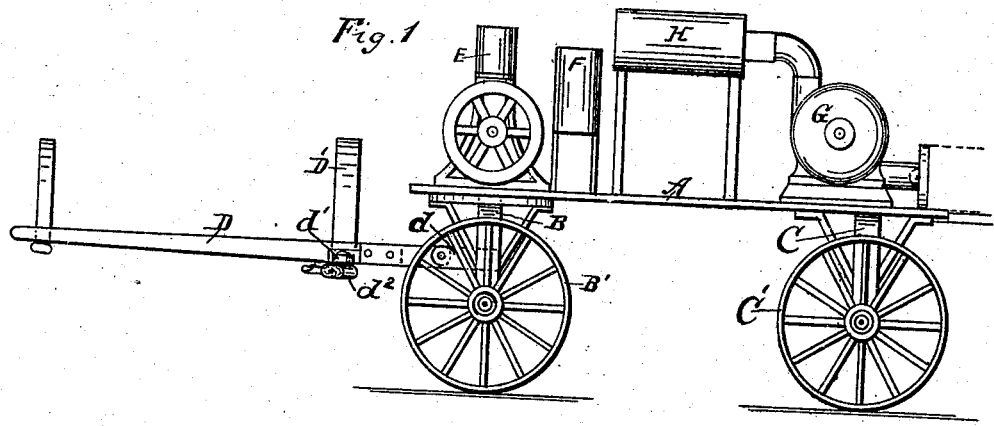
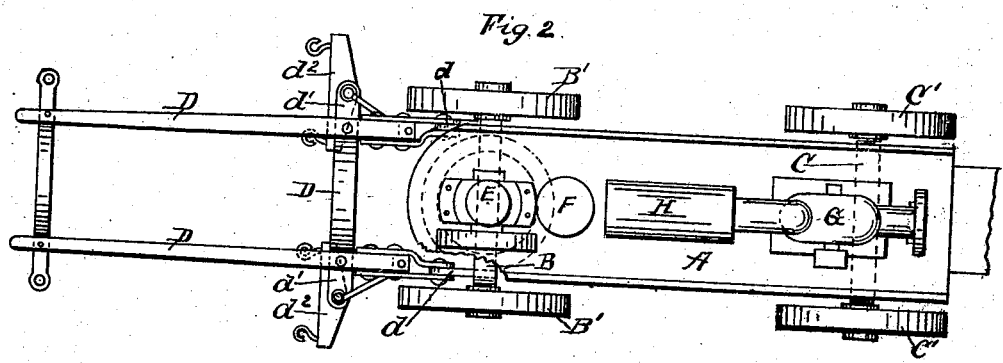
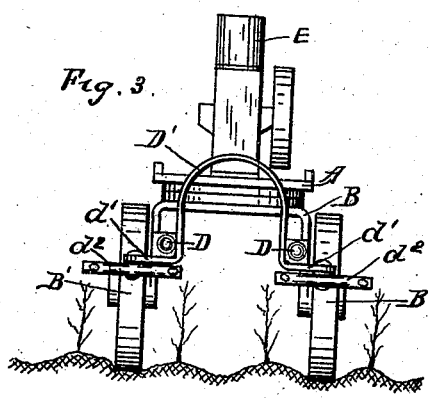
Witnesses:
Robert M. Ware.
Anna F. Brainard.
Inventor
George H. Zempter
By his Attorney
Benj. A. Dare

UNITED STATES PATENT OFFICE.

GEORGE H. ZEMPTER, OF GREENVILLE, MISSISSIPPI, ASSIGNOR OF ONE-HALF TO COHN, WITNEY & GOLDFARB, OF GREENVILLE, MISSISSIPPI.

COTTON-HARVESTING MACHINE.

No. 868,061.     Specification of Letters Patent.     Patented Oct. 15, 1907.

Application filed March 12, 1907. Serial No. 362,065.

*To all whom it may concern:*

Be it known that I, GEORGE H. ZEMPTER, a citizen of the United States, and a resident of Greenville, in the county of Washington and State of Mississippi, have invented certain new and useful Improvements in Cotton-Harvesting Machines, of which the following is a specification.

The present invention relates to cotton harvesters and more particularly to the arrangement of the axles and draft devices of the carrying frame, the objects being the support of the platform upon which are mounted the harvesting mechanism, in such an elevated plane as to afford ample clearance for said axles and platform for moving above the plants, while the draft devices permit a team of horses to be hitched to the machine, one horse immediately at the outer side of each of a pair of draft poles, which, while insuring the proper draft, enables each horse to move between a row of plants.

In the accompanying drawing forming part of this specification. Figure 1, is a side view of so much of a cotton harvester as is required to illustrate my invention. Fig. 2 is a plan view, and Fig. 3 a front elevation of the parts disclosed in Fig. 1.

Similar reference characters are employed to designate corresponding parts in the several figures of the drawing wherein they occur.

My construction of cotton harvester embodies a main support or body involving a novel arrangement of axles mounted on carrying wheels, in connection with certain draft devices. Upon a platform carried by the axles, is the harvesting mechanism comprising in successsive arrangement from the front to the rear, an oil engine of the high compression type, an oil reservoir, a suction chest, a rotary fan exhausting from the suction chest and delivering through an adjustable bag-engaging ring, the fan being belt driven from the engine. In the present case, I have only deemed it necessary to illustrate the engine or motor E, oil reservoir F mounted on the platform A, near the front thereof the suction chest H and rotary fan G, also on said platform but at a point above the rear axle, in order to convey some idea of the general disposition of the elements constituting the harvesting mechanism proper. It will be understood, however, that in so far as the improvements specifically set forth and claimed in the present case, are concerned, they are equally adapted for service in connection with other types of harvesting mechanism.

As shown, the main support or body of the harvester, comprises the extended horizontal platform A, at the underside of which are the front and rear axles B, C, upon the spindles of which turn the carrying wheels B', C'. The axles are of the arched character indicated in Fig. 3, so as to support the platform in an elevated plane with respect to the wheels and thereby afford ample clearance for said axles and platform for moving above the plants.

On the front axle, immediately contiguous to the inner sides of the wheels B', are thills $d$, to which are pivotally attached the inner ends of poles D, which in turn are connected by a transverse draft bar D', arched between the poles and having its ends $d'$, projecting laterally beyond the poles, for the pivotal location of trees $d^2$. It will be seen by this arrangement, a team of horses can be hitched to the machine, one horse immediately at the outer side of each pole, which, while insuring the proper draft, enables each horse to move between a row of plants.

It will be appreciated from the foregoing description, that a wheeled support for a cotton harvester, constructed and equipped as explained, is not only comparatively simple and durable in construction, but can be utilized in connection with a team of horses so that the plants will in no way be disturbed or injured, and the horses exert a highly satisfactory draft power.

I do not desire to be understood as limiting myself to the precise features and arrangement of parts shown and described, but reserve the right to all modifications that may be fairly within the scope of my invention.

Having now described my invention, what I claim as new and desire to secure by Letters Patent, is—

1. In a wheeled carrier for cotton harvesters, the combination with the support A, and arched front and rear axles, together with carrying wheels, of poles at each side having thill connections with the front axle contiguous to its carrying wheels, an arched draft-bar connecting said poles and having the top of its arch extending to the horizontal plane of the support A, while the lower laterally extending ends of said draft bar connected with the poles project beyond the same, and team connecting provision on said projecting ends.

2. In a cotton harvester, the combination with the support A, and arched front and rear axles, together with carrying wheels, of poles at each side having thill connections with the front axle, an arched draft bar connecting said poles and having its ends projecting beyond said poles, and trees connected to said projecting ends.

Signed at Greenville, in the county of Washington, and State of Mississippi, this 23d day of February, A. D. 1907.

GEORGE H. ZEMPTER.

Witnesses:
JOEL COHN,
BEN. NILKEN.